United States Patent
Miyazaki (10) Patent No.: US 8,348,432 B2
(45) Date of Patent: Jan. 8, 2013

(54) LIGHT SOURCE UNIT THAT INCLUDES A LUMINESCENT MATERIAL, A PRIMARY LIGHT SOURCE THAT EMITS LIGHT TO EXCITE THE LUMINESCENT MATERIAL, AND A SECONDARY LIGHT SOURCE, AND PROJECTOR

(75) Inventor: Takeshi Miyazaki, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 169 days.

(21) Appl. No.: 12/826,740

(22) Filed: Jun. 30, 2010

(65) Prior Publication Data
US 2010/0328627 A1 Dec. 30, 2010

(30) Foreign Application Priority Data
Jun. 30, 2009 (JP) .................................. 2009-155483

(51) Int. Cl.
*G03B 21/00* (2006.01)
*G03B 21/26* (2006.01)
(52) U.S. Cl. ........................................... 353/31; 353/94
(58) Field of Classification Search ................... 353/84, 353/94, 31; 348/743
See application file for complete search history.

(56) References Cited

U.S. PATENT DOCUMENTS

| | | | |
|---|---|---|---|
| 2007/0230179 A1* | 10/2007 | Ripoll et al. | 362/277 |
| 2009/0034284 A1* | 2/2009 | Li et al. | 362/554 |
| 2009/0187234 A1 | 7/2009 | Meyer et al. | |
| 2010/0309439 A1* | 12/2010 | Bi et al. | 353/33 |

FOREIGN PATENT DOCUMENTS

| | | |
|---|---|---|
| JP | 2003-233123 A | 8/2003 |
| JP | 2004-341105 A | 12/2004 |
| JP | 2006-113336 A | 4/2006 |
| JP | 2007-218956 A | 8/2007 |
| JP | 2008-052070 A | 3/2008 |
| WO | 2007/141688 A1 | 12/2007 |

OTHER PUBLICATIONS

Chinese Office Action dated Jul. 21, 2011 (and English translation thereof) in counterpart Chinese Application No. 201010221303.8.
Japanese Office Action dated Jan. 6, 2011 (and English translation thereof) in counterpart Japanese Application No. 2009-155483.
Decision to grant a Patent dated Feb. 24, 2011 (and English translation thereof) in counterpart Japanese Application No. 2009-155483.

* cited by examiner

*Primary Examiner* — Thanh Luu
*Assistant Examiner* — Danell L Owens
(74) *Attorney, Agent, or Firm* — Holtz, Holtz, Goodman & Chick, PC (57) ABSTRACT

To provide a light source unit which can increase luminance and a projector including this light source unit. This light source unit includes a luminous wheel having a segment area on which a luminescent material layer is formed which emits light of a predetermined wavelength band by receiving light, and a segment area which is made into a transmission portion which transmits light, a primary light source which shines light of a visible wavelength band on to the luminous wheel, a secondary light source which emits light of a wavelength band which is different from light from the luminescent material layer and light from the primary light source, a collective optical system which collects light from the luminous wheel and the secondary light source to cause them to converge to the same optical path, and a light source control device which controls the emission of light from the light sources.

7 Claims, 7 Drawing Sheets

LIGHT SOURCE UNIT THAT INCLUDES A LUMINESCENT MATERIAL, A PRIMARY LIGHT SOURCE THAT EMITS LIGHT TO EXCITE THE LUMINESCENT MATERIAL, AND A SECONDARY LIGHT SOURCE, AND PROJECTOR

CROSS-REFERENCE TO RELATED APPLICATIONS

This application is based upon and claims the benefit of priority under 35 USC 119 of Japanese Patent Application No. 2009-155483 filed on Jun. 30, 2009, the entire disclosure of which, including the description, claims, drawings and abstract thereof, is incorporated herein by reference.

BACKGROUND OF THE INVENTION

1. Field of the Invention

The present invention relates to a light source unit and a projector which includes the light source unit.

2. Description of the Related Art

In these days, data projectors are used on many occasions as image projection apparatuses which project images of screens and video images of personal computers, as well as images of image data stored in memory cards on to a screen. These projectors are such that light emitted from a light source is caused to converge to a micromirror device called DMD (Digital Micromirror Device) or a liquid crystal plate for display of a color image on the screen.

In projectors of the type described above, conventionally, projectors in which a high-intensity discharge lamp is used as a light source have been the mainstream of projectors. In recent years, however, there have been made many developments and proposals on light source units which use as a light source a light emitting diode or a laser diode, or devices using organic EL technology or luminescence technology using luminescent materials. For example, Japanese Unexamined Patent Publication No. 2004-341105 (JP-A-2004-341105) proposes a light source unit which includes a luminous wheel which is made up of a disc-shaped transparent base material and on which a luminescent material layer is disposed which receives ultraviolet light as excitation light emitted from a solid-state light source and converts the ultraviolet light so received into visible light and the solid-state light source. In the light source unit proposed in JP-A-2004-341105, ultraviolet light is shone on to the luminescent material layer formed on the surface of the luminous wheel as excitation light, so that different types of luminescent light of red, green and blue wavelength bands can be emitted. However, since the luminous efficiency of the red luminescent material is lower than those of the other luminescent materials, there has been caused a problem that the luminance of red becomes insufficient.

SUMMARY OF THE INVENTION

The invention has been made in view of the problem inherent in the related art and an object thereof is to provide a light source unit comprising a luminous wheel having a luminescent material of a kind having a good light emitting efficiency, a light source which excites the luminescent material, and a single-color light source which emits light of a wavelength band which corresponds to a luminescent material of a kind having a relatively low luminous efficiency to thereby increase a luminance of a screen, and a projector which includes this light source.

According to a preferred aspect of the invention, there is provided a light source unit comprising a light emitting plate which has a plurality of segment areas on a base material and in which at least one of the plurality of segment areas is made into a reflecting portion, a luminescent material layer is formed on the reflecting area which emits light of a predetermined wavelength band by receiving excitation light, and at least one of the plurality of segment areas is made into a transmission portion which transmits light, a primary light source which shines excitation light on to a luminescent material on the luminescent material layer, a secondary light source which emits light of a wavelength band which is different from luminescent light emitted from the luminescent material layer and excitation light emitted from the primary light source, a collective optical system which collects light emitted from the light emitting plate and light emitted from the secondary light source so as to cause them to converge to the same optical path, and a light source control means which controls the emission of light from the primary light source and the secondary light source.

BRIEF DESCRIPTION OF THE DRAWINGS

The above and further objects, characteristics and advantages of the invention will be more obvious from accompanying drawings and the following detailed description of the invention. In the drawings.

DETAILED DESCRIPTION OF THE PREFERRED EMBODIMENT

Hereinafter, a preferred mode for carrying out the invention will be described by use of the accompanying drawings. However, in the following embodiment, although various preferred technical limitations will be described as being made for carrying out the invention, the scope of the invention is not limited at all to the following embodiment and illustrated examples.

A projector 10 of the invention includes a light source unit 63, a display device 51, a cooling fan, a light source side optical system 62 for guiding light from the light source unit 63 to the display device 51, a projection side optical system 90 for projecting an image emitted from the display device 51 on to a screen, a projector control means for controlling the light source unit 63 and the display device 51, and a light source control circuit 41 which is a light source control means for controlling the emission of light from a primary light source 72 and a secondary light source 82 of the light source unit 63.

This light source unit 63 has a luminous wheel 71 which is a light emitting plate. The luminous wheel 71 has two semi-circular segment areas which lie adjacent to each other on a base material whose rotation can be controlled. A primary area 1, which is one of the segment areas, is made into a reflecting portion, and a luminescent material layer 131 is formed on the reflecting portion. The luminous material layer 131 receives excitation light to emit light of a green wavelength band. A secondary area 2, which is the other segment area, is made into a transmission portion which transmits light. The light source unit 63 includes the primary light source 72 which shines excitation light in a visible light range on to a luminescent material on the luminescent material layer 131, the secondary light source 82 which emits light of a wavelength band which is different from those of luminescent light emitted from the luminescent material layer 131 and excitation light emitted from the primary light source 72, and a collective optical system which collects light emitted from the luminous wheel 71 and light emitted from the secondary light source so as to cause them to converge to the same optical path.

In addition, the collective optical system has a primary optical axis changing mirror 151a and secondary to quaternary optical axis changing mirrors 151b, 151c, and 151d. The primary optical axis changing mirror 151a is disposed between the primary light source 72 and the luminous wheel 71. The primary optical axis changing mirror 151a is a dichroic mirror which allows excitation light and light from the secondary light source 82 to pass therethrough and reflects luminescent light from the luminescent material. The secondary to quaternary optical axis changing mirrors 151b, 151c, and 151d constitute a plurality of reflecting mirrors or dichroic mirrors which collect excitation light which passes through the transmission portion of the luminous wheel 71, luminescent light which is reflected on the primary optical axis changing mirror 151a and light which is emitted from the secondary light source 82 so as to cause them not only to converge to the same optical path but also to be emitted towards the same direction.

In addition, a base material used for the primary area 1 of the luminous wheel 71 is an opaque base material which is made of a heat conductive material such as a copper or aluminum plate. A base material used for the secondary area is formed of a glass base material or transparent resin base material. In addition, a reflecting layer which reflects light is formed on a surface of a side of the primary area 1, which is made into the reflecting portion, of the base material where the luminescent material layer 131 is disposed through vacuum deposition using silver, and the luminescent material layer 131 is formed on the reflecting layer so formed.

Then, a diffuse layer 141 is formed on the base material of the secondary area 2, which is made into the transmission portion, and this diffuse layer 141 is adapted to diffuse light from the primary light source 72 and passes therethrough.

Additionally, the primary light source 72 is a laser emitter and emits light of a blue wavelength band whose wavelength is shorter than that of light of a green wavelength band emitted from the green luminescent material layer 131. The secondary light source 82 is a light emitting diode which emits light of a red wavelength band.

Figure 1:
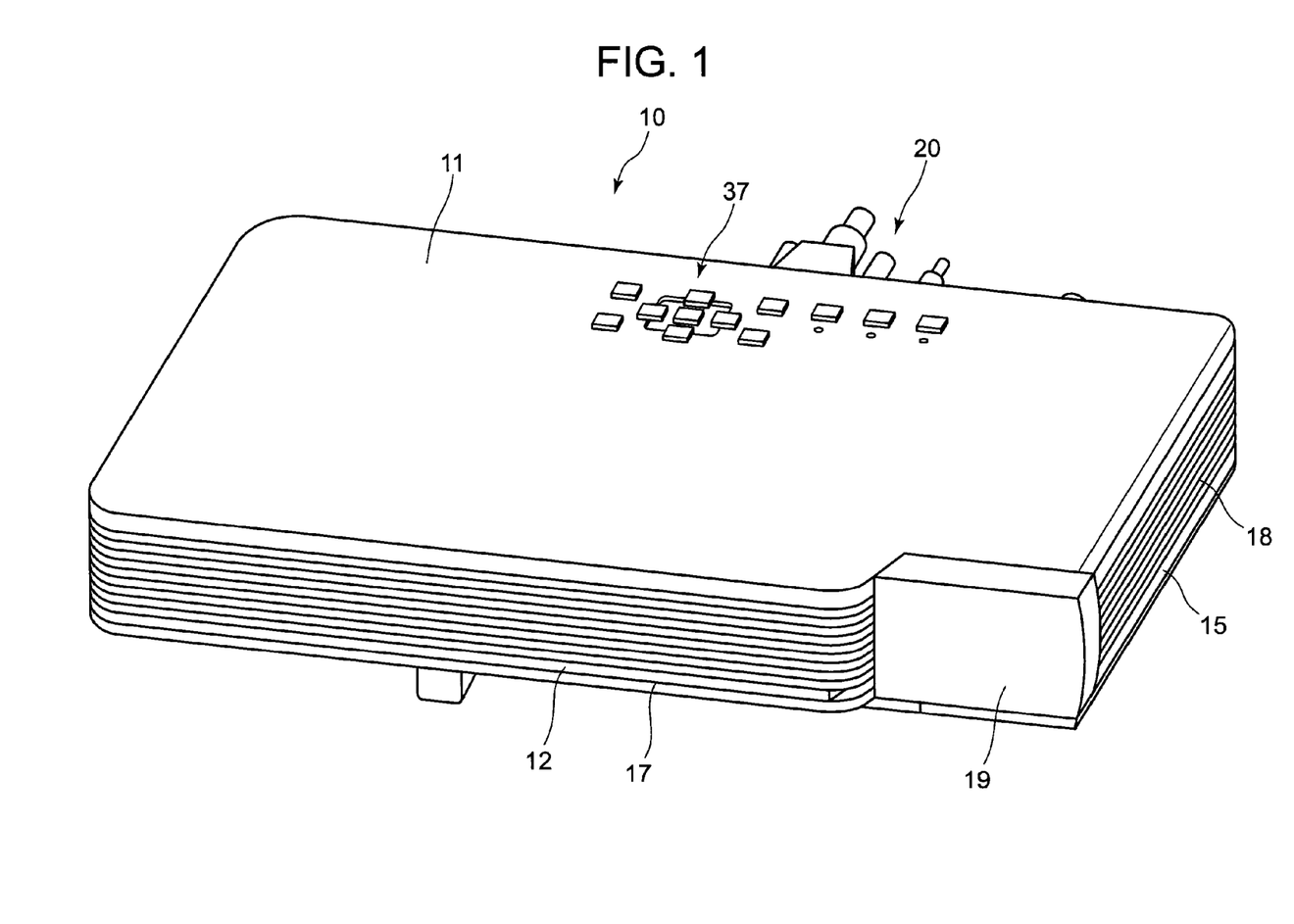
FIG. 1 is a perspective view showing an external appearance of a projector which includes a light source unit according to an embodiment of the invention.

Hereinafter, an embodiment of the invention will be described by reference to the accompanying drawings. FIG. 1 is a perspective view showing an external appearance of a projector 10. When referred to in this embodiment, left and right denote, respectively, left and right directions with respect to a projecting direction of the projector 10, and front and rear denote, respectively, front and rear directions with respect to a traveling direction of a light beam emitted from the projector 10. As is shown in FIG. 1, the projector 10 has a substantially rectangular parallelepiped shape and has a lens cover 19 which covers a projection port which lies to a side of a front panel 12 which is referred to as a front side panel of a main body case, as well as a plurality of inside air outlet holes 17 in the front panel 12. Further, although not shown, the projector 10 includes an Ir reception part for receiving a control signal from a remote controller.

In addition, a keys/indicators part 37 is provided on an upper side panel 11 which makes up the main body case. Disposed on this keys/indicators part 37 are keys and indicators which include a power supply switch key, a power indicator which informs whether the power supply is on or off, a projection switch key which switches on or off projection, an overheat indicator which informs of an overheat condition when the light source unit, the display device or the control circuit overheats and the like.

Further, provided on a back side or a back side panel of the main body case are an input/output connectors part where USB terminals, an image signal input D-SUB terminal, an S terminal, an RCA terminal and the like are provided and various types of terminals 20 including a power supply adaptor plug and the like. A plurality of outside air inlet holes 18 are formed in proximity to lower portions of a right-hand side panel 14 which constitutes a side panel, not shown, of the main body case and a left-hand side panel 15 which is a side panel shown in FIG. 1.

Figure 2:
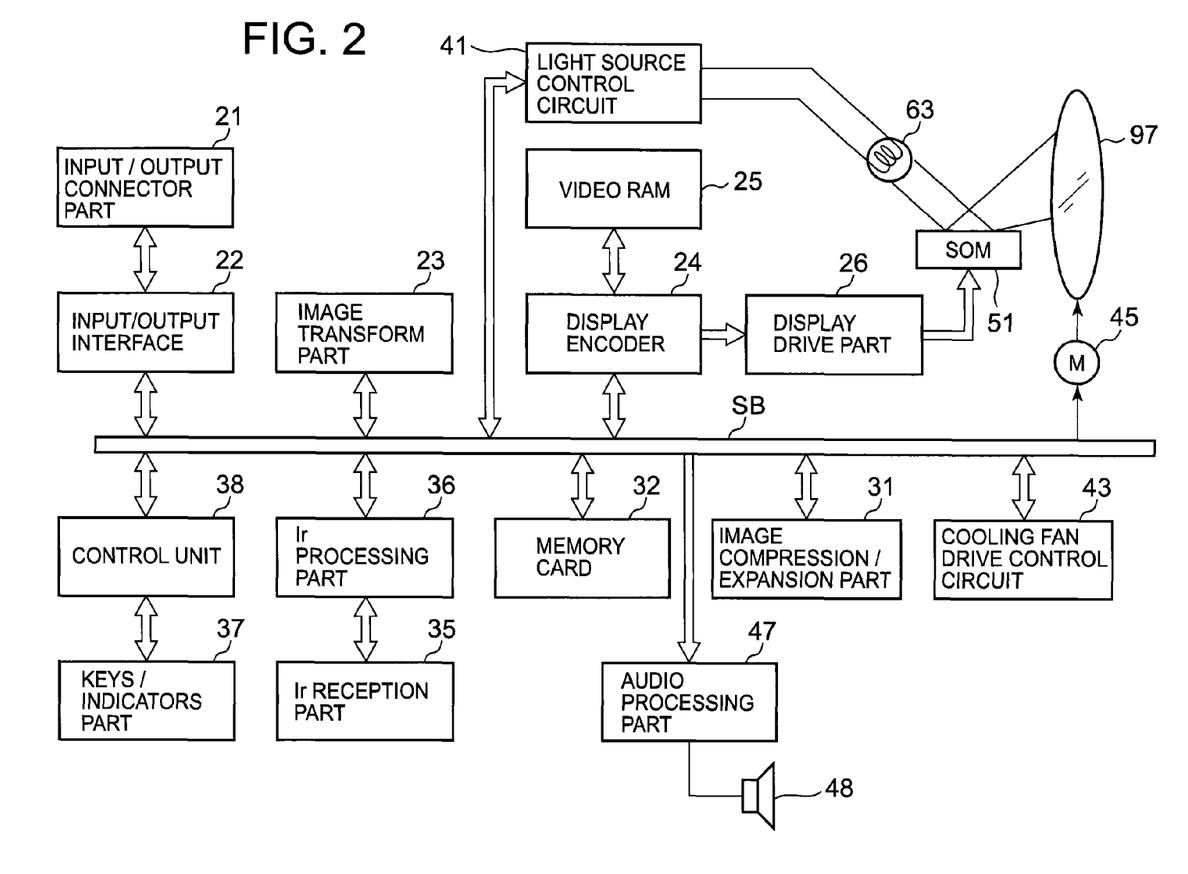
FIG. 2 is a functional circuit block diagram of the projector which includes the light source unit according to the embodiment of the invention.

Next, a projector control means for the projector 10 will be described by use of a block diagram in FIG. 2. The projector control means is made up of a control unit 38, an input/output interface 22, an image transform part 23, a display encoder 24, a display drive part 26 and the like. Image signals of various standards that are inputted from the input/output connector part 21 are sent via the input/output interface 22 and a system bus (SB) to the image transform part 23 where the image signals are transformed so as to be unified into an image signal of a predetermined format which is suitable for display. Thereafter, the image signals so transformed are then outputted to the display encoder 24.

The control unit 38 governs the control of respective operations of circuitries within the projector 10 and is made up of a CPU, a ROM which stores in a fixed fashion operation programs of various types of settings and a RAM which is used as a work memory.

In addition, the display encoder 24 deploys the image signals inputted thereinto on a video RAM 25 for storage therein and generates a video signal from the contents stored in the video RAM 25, outputting the video signal so generated to the display drive part 26.

The display drive part 26 drives a display device 51 which is a spatial optical modulator (SOM) at an appropriate frame rate in accordance with the image signal outputted from the display encoder 24. To be specific, a light beam emitted from a light source unit 63 is caused to enter the display device 51 via a light source side optical system to thereby form an optical image by reflected light reflected at the display device 51. Then, the image so formed is projected on to a screen, not shown, for display via a projection system lens group which is referred to as a projection side optical system. A movable lens group 97 of the projection side optical system is driven by a lens motor 45 for zooming or focusing.

In addition, an image compression/expansion part 31 performs a recording operation in which a luminance signal and a color-difference signal of the image signal are data compressed through processings such as ADCT and Huffman coding so as to write them sequentially on a memory card 32 which is referred to as a detachable recording medium. Further, the image compression/expansion part 31 performs an operation in which when in a reproducing mode, the image compression/expansion part 31 reads out image data recorded on the memory card 32 and expands individual image data which make up a series of dynamic images frame by frame. Then, the image data is outputted to the display encoder 24 via the image transform part 23 so as to enable the display of dynamic images on the basis of the image data stored on the memory card 32.

Operation signals generated at the keys/indicators part 37 which is made up of the main keys and indicators provided on the upper side panel 11 of the main body case are sent out directly to the control unit 38, while key operation signals generated by operating keys on the remote controller are received by the Ir reception part 35, and a code signal demodulated at an Ir processing part 36 is outputted to the control unit 38.

In addition, a audio processing part 47 is connected to the control unit 38 via the system bus (SB). This audio processing part 47 includes a sound source circuit such as a PCM sound source. When in a projection mode and a reproducing mode, the audio processing part 47 converts audio data into analog signals and drives a speaker 48 to output loudly sound or audio based on the audio data.

Additionally, the control unit 38 controls a light source control circuit 41 which is the light source control means. This light source control circuit 41 controls the emission of light from the primary light source and the secondary light source of the light source unit 63 in accordance with an image signal. Further, the control unit 38 causes a cooling fan drive control circuit 43 to detect temperatures through a plurality of sensors which are provided at the light source unit 63 and the like so as to control the rotating speed of the cooling fan based on the results of the temperature detection. In addition, the control unit 38 also causes the cooling fan drive control circuit 43 to make the cooling fan continue to rotate even after the power supply of the projector main body is switched off by use of a timer or the like or to make the power supply to the projector main body be cut off depending upon the results of the temperature detection by the temperature sensors.

Figure 3:
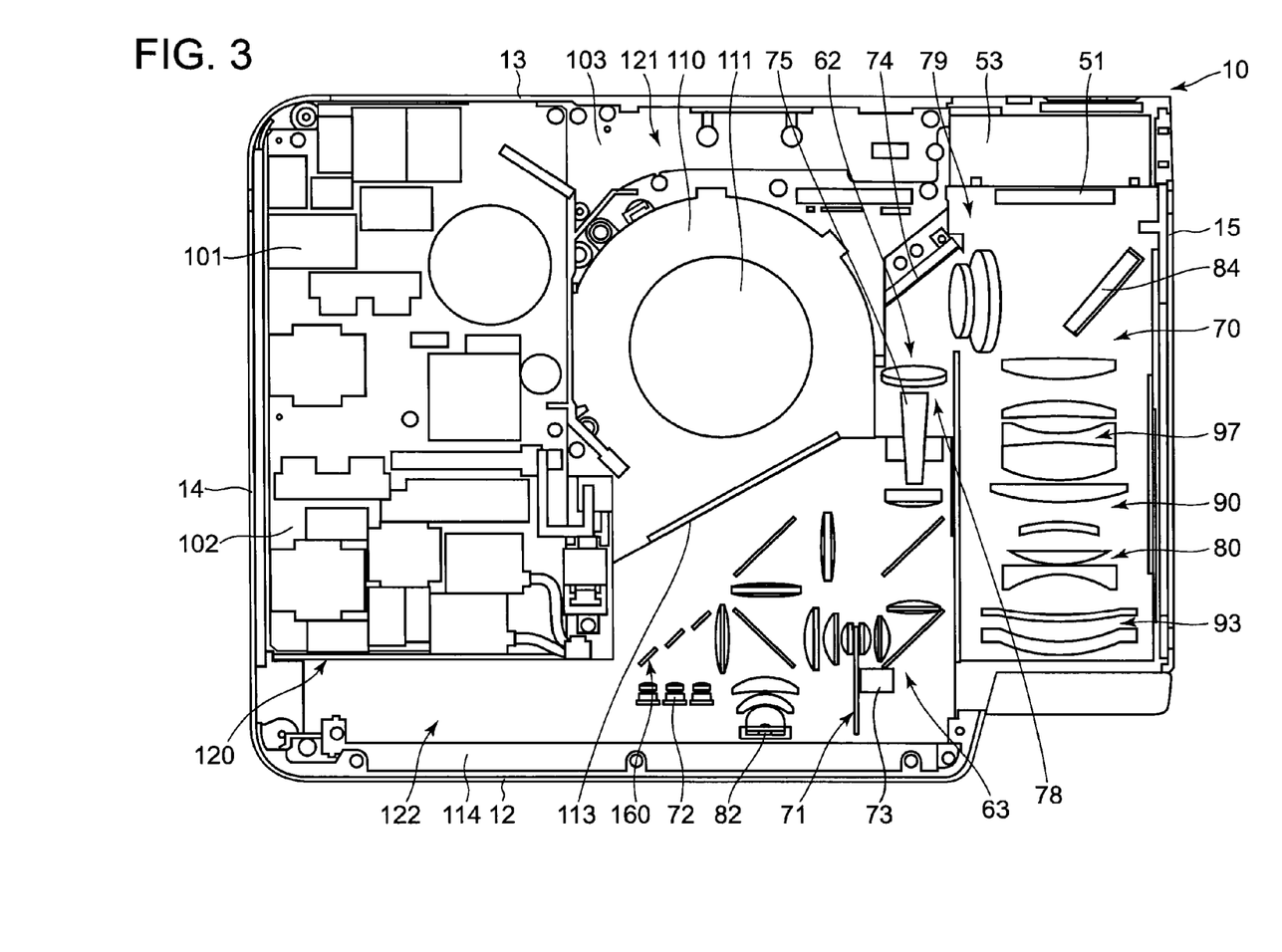
FIG. 3 is an exemplary plan view showing an internal construction of the projector which includes the light source unit according to the embodiment of the invention.

Next, an internal construction of the projector 10 will be described. FIG. 3 is an exemplary plan view showing an internal construction of the projector 10. As is shown in FIG. 3, in the projector 10, a light source control circuit board 102 is disposed in proximity to the right-hand side panel 14, and a power supply circuit block 101 and the like are mounted on this light source control circuit board 102. A sirocco fan-type blower 110 is disposed substantially at a center in the projector 10. In addition, a control circuit board 103 is disposed in proximity to the blower 110, and the light source unit 63 is disposed in proximity to the front panel 12, an optical system unit 70 being disposed in proximity to the left-hand side panel 15. Additionally, an interior of a housing of the projector 10 is divided airtightly into an inlet side space compartment 121 which lies on the back panel 13 side and an outlet side space compartment 122 which lies on the front panel 12 side by a portioning bulkhead 120. The blower 110 is disposed so that its outside air inlet port 111 is positioned in the inlet side space compartment 121 and its inside air outlet port 113 is positioned on a boundary between the outlet side space compartment 122 and the inlet side space compartment 121.

The optical system unit 70 has a substantially U-shape and is made up of three blocks such as an illumination side block 78 which is positioned in proximity to the light source unit 63, an image generation block 79 which is positioned on the back panel 13 side, and a projection side block 80 which is positioned between the illumination side block 78 and the left-hand side panel 15.

The illumination side block 78 includes part of a light source side optical system 62 for guiding light emitted from the light source unit 63 to the display device 51 which is included in the image generation block 79. A light smoothing or light guiding unit 75 for making a light beam emitted from the light source 63 into a light beam whose intensity is uniformly distributed and a collective lens for collecting light that has passed through the light guiding unit 75 are included in the part of the light source side optical system 62 that is included in the illumination side block 78.

The image generating block 79 has, as the light source side optical system 62, an optical axis changing mirror 74 for changing a direction of an optical axis of the light beam that has emerged from the light guiding unit 75, a plurality of collective lenses for causing light reflected by the optical axis changing mirror 74 to converge to the display device 51 and a shining mirror 84 for shining the light beam that has passed through the collective lenses on to the display device 51 at a predetermined angle. Further, the image generating block 79 includes a DMD which is configured as the display device 51, and a display device heatsink or cooling device 53 for cooling the display device 51 is disposed on a back panel 13 side of the display device 51 to thereby prevent the display device 51 from being heated to a high temperature.

The projection side block 80 has lens groups of the projection side optical system 90 which projects light on to the screen, which light is reflected by the display device 51 to form an image. The projection side optical system 90 constitutes a variable focus lens made up of a fixed lens group 93 which is incorporated in a fixed lens barrel and the movable lens group 97 which is incorporated in a movable lens barrel and having a zooming function. This variable focus lens enables zooming and focusing operations by moving the movable lens group 97 by a lens motor.

In addition, in the interior construction of the projector 10, members that are heated to lower temperatures than the light source unit 63 are disposed within the inlet side space compartment 121. Specifically, disposed in the inlet side space compartment 121 are the light source control circuit board 102, the blower 110, the control circuit board 103, the image generation block 79 of the optical system unit 70, the projection side block 80 of the optical system unit 70 and the collective lens in the illumination side block 78 of the optical system unit 70.

On the other hand, disposed in the outlet side space compartment 122 are the light source unit 63 which is heated to relatively high temperatures, the light guiding unit 75 included in the illumination side block 78 of the optical system unit 70, and an outlet air temperature reducing unit 114.

In addition, the light source unit 63 includes a luminous wheel 71 which constitutes a light emitting plate on to which light is shone to thereby emit light of wavelength bands of green and blue which are part of the three primary colors of light, a wheel motor 73 which constitutes a drive unit for driving rotationally the luminous wheel 71, a plurality of primary light sources 72 which shines light of the blue wavelength band on to the luminous wheel 71, and a secondary light source 82 which emits light of a wavelength band of red which is one of the three primary color of light.

Then, the plurality of primary light sources 72 is disposed so that an optical axis of each of the primary light sources 72 is substantially parallel to an optical axis of the light guiding unit 75. In addition, the secondary light source 82 is also disposed so that an optical axis of the secondary light source 82 becomes substantially parallel to the optical axis of the light guiding unit 75. The luminous wheel 71 is disposed so that the optical axes of the primary light sources 72 whose directions are changed through 90 degrees by a reflecting mirror system 160 are substantially at right angles to a wheel surface of the luminous wheel 71. In other words, a rotating axis of the wheel motor 73 which rotates the luminous wheel 71 is parallel to the optical axes of the primary light sources 72 whose directions are changed by the reflecting mirror system 160.

These primary light sources 72 are designed to shine light on to a luminescent material layer and a diffusive layer which are disposed in proximity to an outer circumferential portion of the luminous wheel 71, which will be described later. The primary light sources 72 are configured as laser emitters which emit light of the blue wavelength band which is visible light whose wavelength is shorter than that of light of the green wavelength band that is emitted from the luminescent material layer. In addition, the secondary light source 82 is configured as a red light emitting diode which emits light of the red wavelength band.

Figure 4A:
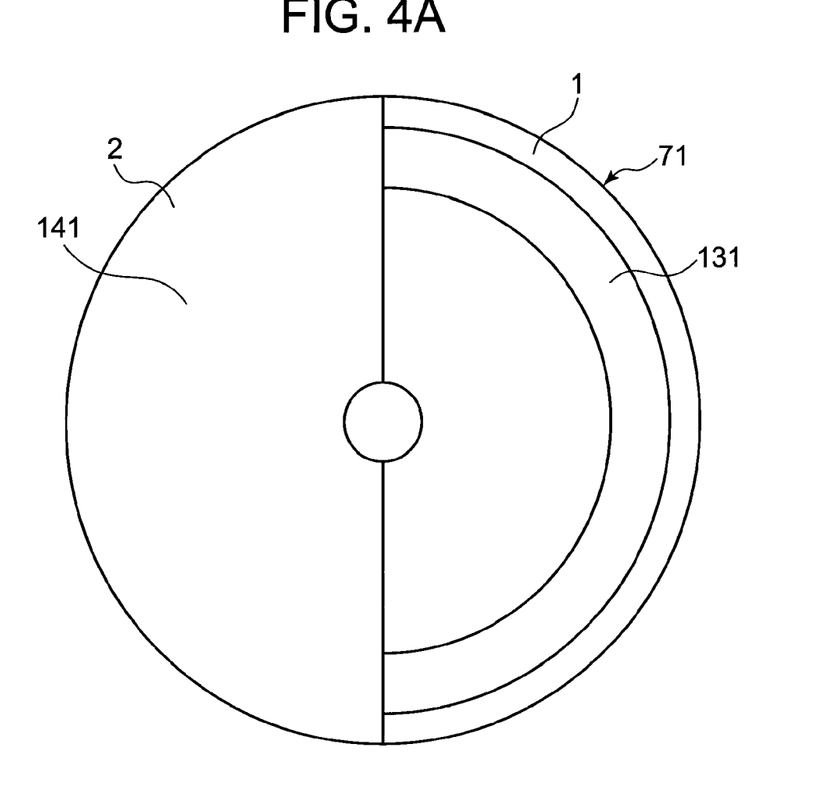
FIG. 4 shows an exemplary front view of a luminous wheel according to the embodiment of the invention and an exemplary plan view of the luminous wheel which is partially sectioned.
Figure 4B:
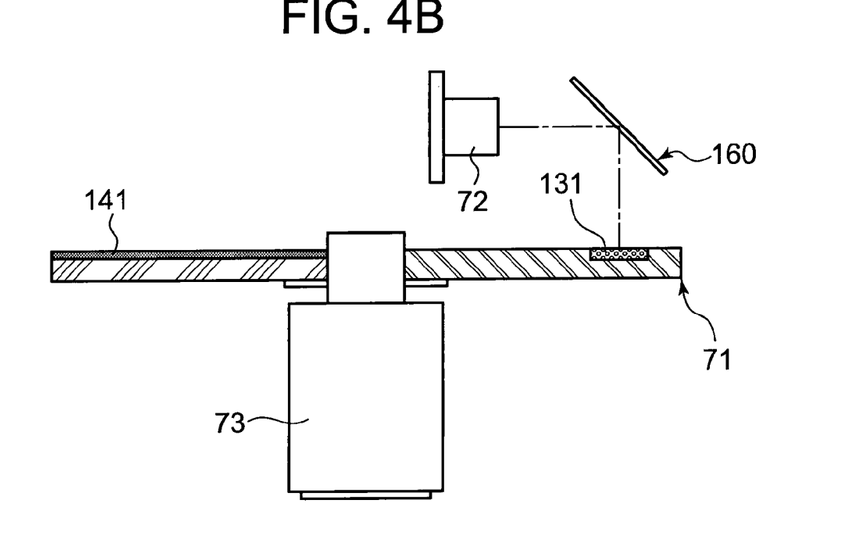

As is shown in FIGS. 4A, 4B, the luminous wheel 71 which constitutes the light emitting plate is a thin disc-shaped base material which includes the luminescent material layer 131. A circular opening is formed in a central portion of the base material, and the circular opening so formed corresponds to a shape of a cylindrical rotating shaft which constitutes a connecting portion to the wheel motor 73. The rotating shaft is securely inserted into the circular opening and a motor hub is bonded to the base material in a position lying in proximity to the central portion thereof, whereby the luminous wheel 71 is strongly and rigidly connected to the rotating shaft of the wheel motor 73.

Consequently, this luminous wheel 71 rotates integrally in a circumferential direction by the wheel motor 73. The wheel motor 73 is a driving unit which is controlled to be driven at a rotational speed of about 120 revolutions per second by the control unit 38 of the projector control means. Namely, the luminous wheel 71 is designed to be controlled rotationally.

This base material has two semicircular segment areas which lie adjacent to each other. A primary area 1, which constitutes one of the segment areas, is made into a reflecting portion. A base material used for the primary area 1 functioning as the reflecting portion is an opaque base material which is made of a heat conductive material such as a copper or aluminum plate. A reflecting layer is formed on a surface of a primary light source 72 side of the base material where the luminescent material layer 131 is disposed through vacuum deposition using silver, and the luminescent material layer 131 is formed on the reflecting layer so formed. The reflecting layer reflects light of the blue wavelength band which is emitted from the primary light sources 72 and luminescent light of the green wavelength band which is generated by a luminescent material on the luminescent material layer 131.

Then, a belt-like recess portion is formed on the first area 1 of the base material in a position which lies in proximity to an outer circumferential portion thereof, and the luminescent material layer 131 is formed in the recess portion. This luminescent material layer 131 is a layer which contains a luminescent material which absorbs, when light is shone on thereto from the primary light sources 72, the light from the primary light sources 72 as excitation light to thereby be excited to emit light of the wavelength band of green which is one of the three primary colors of light. Note that this luminescent material layer 131 is made up of a crystal of luminescent material and a binder.

In addition, the secondary area 2, which constitutes the other segment area and on which the luminescent material layer 131 is not disposed, is made into a transmission portion through which blue light from the primary light sources 72 is allowed to pass. The second area 2, which is the transmission portion, has a diffuse layer 141 on a surface of a primary light source 72 side thereof. To be specific, the diffuse layer 141 is formed by applying an optical treatment such as a roughening one using blasting to the second area which is made of a transparent material, and the diffuse layer 141 so formed imparts a diffuse effect to blue light emitted from the primary light sources 72 when the light passes through the diffuse layer 141.

Note that the diffuse layer 141 may be formed by securing a belt-like solid substance which is an optical substance to a surface of the transparent base material, in addition to the application of the optical treatment to the surface thereof. In addition, the diffuse layer 141 may be formed on a surface of an opposite side of the second area to the side facing the primary light sources 72, in place of forming the diffuse layer 141 on the surface of the primary light source 72 side of the second area.

In this way, since the luminescent material layer 131 and the diffuse layer 141 are disposed adjacent to each other in a circumferential direction in the two segment areas, light from the blue light sources is sequentially shone on to the luminescent material layer 131 and the diffuse layer 141 of the luminous wheel 71 which is rotating. Thus, when light emitted from the primary light sources 72 is shone on to the luminescent material layer 131 on the luminous wheel 71 as excitation light, luminescent light of the green wavelength band is emitted from the luminous wheel 71 towards the primary light sources' 72 side. In addition, when light emitted from the primary light sources 72 is shone on to the diffuse layer 141 on the transmission portion of the luminous wheel 71, blue light emitted from the primary light sources 72 is allowed to pass through the diffuse layer 141 to an opposite side to the primary light sources 72 while being diffused.

Namely, the light source unit 63 can emit separately green luminescent light emitted from the luminescent material layer 131 formed on the reflecting portion of the luminous wheel 71 by causing light from the primary light sources 72 to be shone on to the luminous wheel 71 which is rotating and blue light source light that has passed through the transmission portion of the luminous wheel 71 which has the diffuse layer 141.

To be specific, a luminescent material on the luminescent material layer 131 absorbs light from the blue light sources as excitation light so as to emit luminescent light of the green wavelength band in every direction. In the green luminescent light so emitted, green luminescent light emitted towards the primary light sources' 72 side enters the light guiding unit 75 via a collective optical system, which will be described later, whereas green luminescent light emitted towards the base material is reflected by the reflecting layer, and much of the reflected light is allowed to enter the light guiding unit 75 via the collective optical system as emitted light traveling from the luminous wheel 71 towards the primary light sources' 72 side.

In addition, blue light from the primary light sources 72 which is shone on to the reflecting layer without being absorbed by the luminescent material on the luminescent material layer 131 is also reflected by the reflecting layer and is then emitted again towards the luminescent material layer's 131 side so as to excite the luminescent material. Therefore, the utilization efficiency of blue light from the light sources can be increased, thereby making it possible to emit bright green luminescent light from the luminous wheel 71.

Then, blue light emitted from the primary light sources 72 which is reflected by the reflecting layer to return to the primary light sources' 72 side without being absorbed by the luminescent material travels together with green luminescent light from the luminescent material layer 131 towards the primary light sources' 72 side. However, the blue light of the primary light sources 72 which so travels with the green luminescent light is separated from the green luminescent light by a dichroic mirror which reflects green light while allowing blue light to pass therethrough. Namely, in the light emitted from the luminous wheel 71 towards the primary light sources' 72 side, only the green luminescent light is reflected by the dichroic mirror to thereby be allowed to enter the light guiding unit 75 via other lenses and mirrors of the collective optical system.

Then, when laser light of the blue wavelength band is shone on to the diffuse layer 141 from the primary light sources 72, the diffuse layer 141 imparts a diffuse effect to the blue light shone on thereto from the primary light sources 72. Then, the blue light is diffused to be emitted from the diffuse layer 141 as diffuse light which is similar to light (green luminescent light) emitted from the luminescent material layer 131, and the diffuse light so emitted is then allowed to enter the light guiding unit 75 via the collective optical system.

Here, as another embodiment of a luminous wheel 71, a whole of a base material of a luminous wheel 71 is formed of a transparent base material such as glass or transparent resin material, and a luminescent material layer 131 is formed as a primary area on a surface of a side of the base material which lies opposite to a side which faces the primary light sources 72. Further, a dichroic layer can also be formed as a reflecting portion between the luminescent material layer 131 on the transparent base material and the primary light sources 72. This dichroic layer is designed to reflect only light of a specific wavelength band. To be specific, the dichroic layer is designed to allow an excitation light component to pass therethrough but to reflect light components of other wavelength bands. By adopting this configuration, excitation light from the primary light sources 72 is allowed to pass through the dichroic layer to be shone on to the luminescent material layer 131, and light emitted in every direction from the luminescent material layer 131 is reflected by this dichroic layer, thereby making it possible to increase the utilization efficiency of luminescent light emitted from the luminescent material layer 131.

Thus, as in this embodiment, by making the base material which constitutes a base portion where the luminescent material layer 131 of the luminous wheel 71 is disposed into the reflecting portion, the light source unit 63 can be provided in which optical paths along which blue light from the primary light sources and green luminescent light are emitted from the luminous wheel 71 can be separated without providing a special reflecting layer which reflects only light of a specific wavelength band on the surface of the luminous wheel 71 and which is so simple in configuration as to be fabricated easily. The provision of such a special reflecting layer would otherwise be required in the event that the base portion is made of a transparent base material.

In addition, in the event that the base portion is made of the transparent material and that the dichroic layer is provided, blue light cannot be used which passes through the luminescent material layer 131 without being absorbed by the luminescent material on the luminescent material layer 131. However, in the case of the embodiment in which the base portion is made into the reflecting portion, excitation light shone on to the base portion can be reflected on the reflecting portion so as to be returned to the luminescent material layer 131 without being absorbed by the luminescent material on the luminescent material layer 131. Because of this, the utilization efficiency of excitation light from the primary light sources 72 can be increased so as to emit bright green luminescent light from the luminous wheel 71 without adding any special optical part (for example, a transparent material including an excitation light reflecting layer provided on an exit side of the transparent material which has the luminescent material layer).

Figure 5:
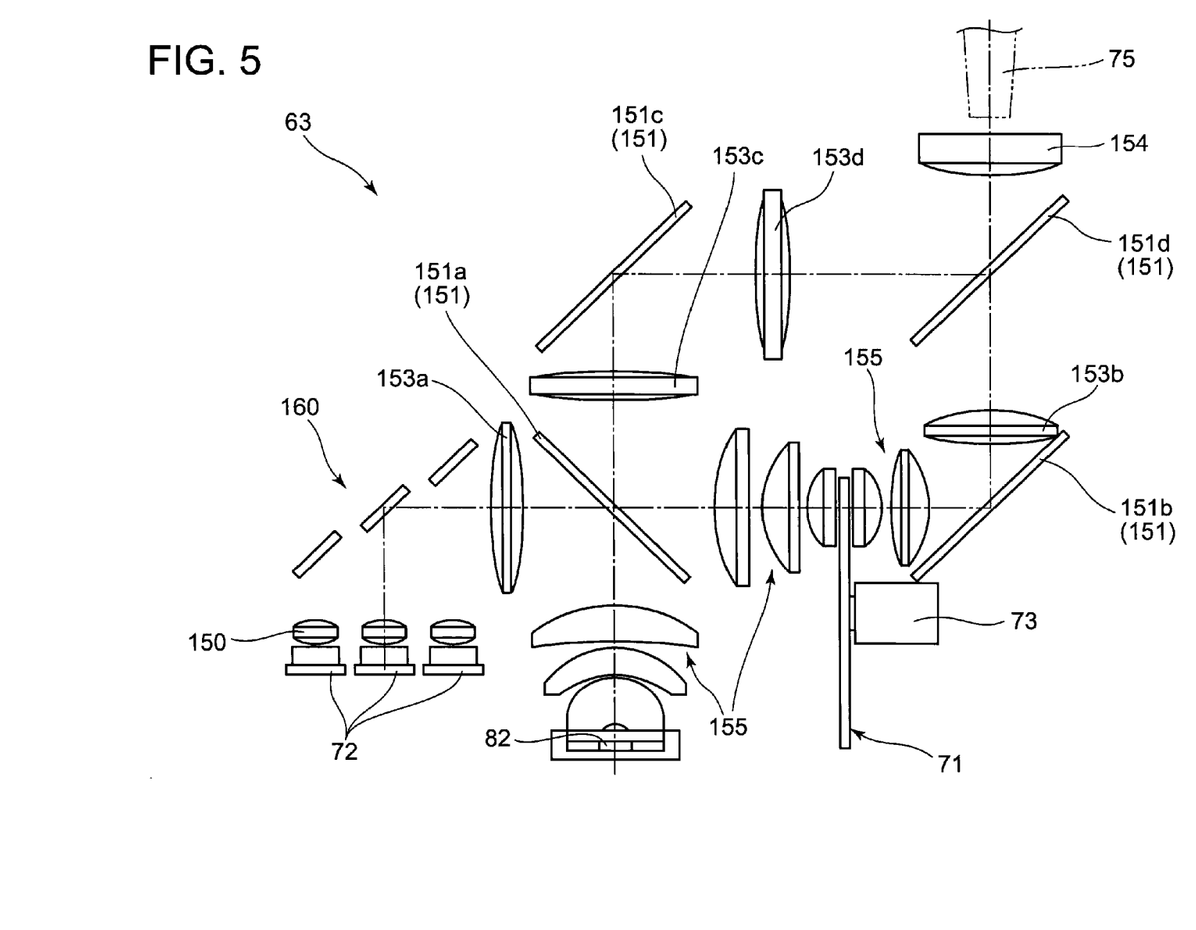
FIG. 5 is an exemplary plan view of the light source unit according to the embodiment of the invention.

Then, as is shown in FIG. 5, the light source unit 63 includes collimator lenses 150 and a reflecting mirror system 160. The collimator lenses 150 are disposed on an exit side of the primary light sources 72 to convert light emitted from the primary light sources 72 into parallel light. The reflecting mirror system 160 is disposed on optical axes of the primary light sources 72 to reflect light emitted from the primary light sources 72 so as to change its direction at an angle of 90 degrees. In addition, the light source unit 63 includes the collective optical system, which is made up of dichroic mirrors and reflecting mirrors which reflect or transmit light of predetermined wavelength bands emitted from the luminous wheel 71 and the secondary light source 82 so that blue light and green light from the luminous wheel 71 and red light from the secondary light source 82 are caused to converge to the same optical path and lenses which causes light beams emitted from the luminous wheel 71 to enter the light guiding unit 75 to converge.

Hereinafter, the collective optical system of the embodiment will be described. This collective optical system includes four optical axis changing mirrors 151 which are disposed in predetermined positions so as to change optical axes of green luminescent light and blue light from the primary light sources or blue light-source light which are emitted from the luminous wheel 71 in different directions for separation and an optical axis of red light-source light emitted from the secondary light source 82 so that the optical axes coincide with each other so as to cause the light of the different colors to converge to the same optical path.

To be specific, this collective optical system has a primary optical axis changing mirror 151a and secondary to quaternary optical axis changing mirrors 151b, 151c, 151d. The primary optical axis changing mirror 151a is a dichroic mirror which is disposed between the primary light sources 72 and the luminous wheel 71 so as to allow excitation light to pass therethrough and to reflect luminescent light from the luminescent material. The secondary to quaternary optical axis changing mirrors 151b, 151c, 151d constitute a plurality of reflecting mirrors and dichroic mirrors which cause excitation light which passes through the transmission portion of the luminous wheel 71, luminescent light reflected on the primary optical axis changing mirror 151a and light emitted from the secondary light source 82 to converge to the same optical path so as to be emitted in the same direction.

In addition, the primary optical axis changing mirror 151a is disposed on the optical axes of the primary light sources 72 whose directions are changed at the angle of 90 degrees by the reflecting mirror system 160 and the optical axis of the secondary light source 82 between the primary light sources 72 and the luminous wheel 71. Additionally, the primary optical axis changing mirror 151a is the dichroic mirror which does not change the optical axes of blue light-source light (excitation light) reflected by the reflecting mirror system 160 and the secondary light source 82 and changes the optical axis of green luminescent light emitted from the luminous wheel 71.

Namely, this primary optical axis changing mirror 151a allows blue light-source light as excitation light emitted from the primary light sources 72 and red light-source light from the secondary light source 82 to pass therethrough and reflects luminescent light of the green wavelength band emitted from the luminescent material on the luminescent material layer 131 while changing its direction at the angle of 90 degrees.

The secondary optical axis changing mirror 151b is a normal reflecting mirror which is disposed in a position which lies on an opposite side to the primary light sources 72 side with respect to the luminous wheel 71 so as to change the optical axis of blue light-source light which passes through the diffuse layer 141 on the transmission portion of the luminous wheel 71 at the angle of 90 degrees on the optical axes of the primary light sources 72 whose directions are changed by the reflecting mirror system 160. Namely, this secondary optical axis changing mirror 151b reflects light of the blue wavelength band which is emitted from the luminous wheel 71 while changing its direction at the angle of 90 degrees. Note that the secondary optical axis changing mirror 151b does not necessarily have to be made into the reflecting mirror but may be made into a dichroic mirror which can reflect light of the blue wavelength band.

The tertiary optical axis changing mirror 151c is a reflecting mirror which is disposed on the optical axis of green luminescent light (that is, on the optical axis of the secondary light source 82) whose direction is changed by the primary optical axis changing mirror 151a so as to confront the primary optical axis changing mirror 151a to change the optical axes of luminescent light whose direction is changed by the primary optical axis changing mirror 151a and the secondary light source 82 through 90 degrees. Namely, the tertiary optical axis changing mirror 151c reflects luminescent light of the green wavelength band which is reflected by the primary optical axis changing mirror 151a and red light-source light from the secondary light source 82 while reflecting their directions by 90 degrees. Note that the tertiary optical axis changing mirror 151c does not necessarily have to be made into the reflecting mirror but may be made into a dichroic mirror which can reflect green light and red light.

The quaternary optical axis changing mirror 151d is a dichroic mirror which is disposed so as to confront the secondary optical axis changing mirror 151b and the tertiary optical axis changing mirror 151c. This dichroic mirror does not change the optical axis of the blue light-source light which has been changed by the secondary optical axis changing mirror 151b but changes the optical axes of the red light and the green luminescent light which have been changed by the tertiary optical axis changing mirror 151c another 90 degrees. Namely, the quaternary optical axis changing mirror 151d is disposed in a position where the optical axis of the blue light-source light which has been reflected by the secondary optical axis changing mirror 151b intersects the optical axes of the green luminescent light and the red light-source light which have been reflected by the tertiary optical axis changing mirror. This quaternary optical axis changing mirror 151d allows the blue light-source light reflected by the secondary optical axis 151b to pass therethrough so as to cause it to travel straight ahead and reflects the red light-source light and the luminescent light of the green wavelength band which have been reflected by the tertiary optical axis changing mirror 151c so as to change their directions by 90 degrees.

By doing so, the blue light-source light that has passed through the quaternary optical axis changing mirror 151d and the red light-source light and the green luminescent light which have been reflected by the quaternary optical axis changing mirror 151d are caused to converge to the same optical path, and the light beams of all those colors are emitted in the same direction.

In this way, in the light source unit 63, by disposing the four optical axis changing mirrors 151 in the collective optical system, the optical axes of blue light and green light which are emitted from the luminous wheel 71 and the optical axis of red light emitted from the secondary light source 82 can be changed so as to coincide with the optical axis of the light guiding unit 75. Thus, the light of the respective colors can be caused to converge to the same optical path and can be shone on to the same direction. Because of this, light of the respective colors emitted from the light source unit 63 is allowed to sequentially enter the light guiding unit 75.

Then, the collective optical system is made up of lenses and the mirrors such as the dichroic mirrors and the like. To be specific, a plurality of lenses are disposed in combination with the mirrors for causing light to converge between the primary light sources 72 and the optical wheel 71, as has been described above, and along the optical paths of the luminescent light from the luminous wheel 71 and the light-source light which has passed through the optical wheel 71. By this configuration, light beams whose traveling directions are changed by the mirrors are caused to converge by the lenses, so as to cause light to enter the light guiding unit 75 with good efficiency.

To be specific, blue light emitted from the plurality of primary light sources 72 is converted into parallel light with increased directivity by the corresponding collimator lenses 150 and the parallel light is then caused to converge by a primary convex lens 153a which is disposed between the reflecting mirror system 160 and the primary optical axis changing mirror 151a. In addition, a collective lens system 155 is disposed in proximity to each of the front and rear sides of the luminous wheel 71, whereby light of the blue wavelength band which has been caused to converge by the primary convex lens 153a is shone on to the luminous wheel 71 in such a state that the light of the blue wavelength band is caused to converge further by the collective lens system 155. In addition, respective light beams which are emitted from both the front and rear sides of the luminous wheel 71 are also caused to converge. Similarly, a collective lens system 155 is also disposed in proximity to an exit plane of the secondary light source 82, whereby a light beam emitted from the secondary light source 82 is caused to converge so as to be shone on to the primary optical axis changing mirror 151a.

Further, a secondary convex lens 151b is disposed between the secondary optical axis changing mirror 151b and the quaternary optical axis changing mirror 151d, a tertiary convex lens 153c is disposed between the primary optical axis changing mirror 151a and the tertiary optical axis changing mirror 151c, and a quaternary convex lens 153d is disposed between the tertiary optical axis changing mirror 151c and the quaternary optical axis changing mirror 151d. Further, a light guiding unit incident lens 154 is disposed between the quaternary optical axis changing mirror 151d and the light guiding unit 75. Because of this, light emitted from the luminous wheel 71 is allowed to enter the light guiding unit 75 as a convergent light beam.

Consequently, the blue light-source light emitted from the primary light sources 72 via the corresponding collimator lenses 150 is caused to converge by the primary convex lens 153a, passes through the primary optical axis changing mirror 151a, and is caused to converge further by the collecting lens system 155 so as to be shone on to the luminescent material layer 131 or the diffuse layer 141 on the luminous wheel 71.

Then, in the event of the light-source light is shone on to the diffuse layer 141 on the secondary area 2 of the luminous wheel 71 which is made into the transmission portion, the blue light-source light, which has now become diffuse light as a result of passing through the diffuse layer 141, is caused to converge by the collective lens system 155 which is disposed in an opposite direction to the primary light sources 72 side of the luminous wheel 71 so as to be shone on to the secondary optical axis changing mirror 151b. In addition, the blue light-source light is reflected by the secondary optical axis changing mirror 151b and is then caused to converge by the secondary convex lens 153b. Thereafter, the blue light-source light passes through the quaternary optical axis changing mirror 151d and is then caused to converge by the light guiding unit incident lens 154 to thereby be allowed to enter the light guiding unit 75.

In addition, in the event of the light-source light being shone onto the luminescent material layer 131 on the primary area 1 which is made into the reflecting portion of the luminous wheel 71, luminescent light of the green wavelength band is emitted to the primary light sources 72 side. Then, the luminescent light is caused to converge by the collective lens system 155 on the primary light sources 72 side of the luminous wheel 71 so as to be shone on to the primary optical axis changing mirror 151a. Here, although the luminescent light is reflected by the primary optical axis changing mirror 151a, the blue light-source light which is reflected by the primary optical axis changing mirror without being absorbed by the luminescent material on the luminescent material layer 131 is allowed to pass through the primary optical axis changing mirror 151a. By this, the green luminescent light and the blue light-source light can be separated from each other so as to prevent a reduction in color purity.

In addition, the luminescent light reflected by the primary optical axis changing mirror 151a is caused to converge by the tertiary convex lens 153c to thereby be shone on to the tertiary optical axis changing mirror 151c. Then, the luminescent light is reflected by the tertiary optical axis changing mirror 151c to thereby be caused to converge by the quaternary convex lens 153d. Thereafter, the luminescent light is shone on to the quaternary optical axis changing mirror 151d. Then, the luminescent light is reflected further by the quaternary optical axis changing mirror 151d and is caused to converge by the light guiding unit incident lens 154 to thereby be allowed to enter the light guiding unit 75.

In addition, red light-source light emitted from the secondary light source 82 and is then caused to converge by the collective lens system 155 passes through the primary optical axis changing mirror 151a. Then, as with the green luminescent light that has been described above, the red light-source light is caused to converge by the tertiary convex lens 153c, the quaternary convex lens 153d and the light guiding unit incident lens 154 when the red light-source light is guided via the tertiary optical axis changing mirror 151c and the quaternary optical axis changing mirror 151d to thereby be allowed to enter the light guiding unit 75.

By adopting the configuration of the collective optical system described heretofore, although a slight amount of blue light-source light reflected from the luminous wheel 71 exists in the light emitted from the luminous wheel 71 in addition to the green luminescent light, the blue light-source light reflected from the luminous wheel 71 and mixed in the luminescent light of the green wavelength band can be cut out by disposing the primary optical axis changing mirror 151a, which is made into the dichroic mirror, between the primary light sources 72 and the luminous wheel 71. Because of this, there can be provided the light source unit 63 which can emit light of the respective colors with high color purity in which the mixing of light-source light in luminescent light can be prevented in an ensured fashion and the projector 10 including the light source unit 63.

Then, when the luminous wheel 71 is rotated and light is emitted from the primary light sources 72 and the secondary light source 82 at different timing, light of the red wavelength band, light of the green wavelength band and light of the blue wavelength band are allowed to enter the light guiding unit 75 sequentially from the luminous wheel 71 via the collective optical system, and the DMD, which is the display device 51, of the projector 10 displays light of the respective colors in a time sharing fashion in accordance with data, thereby making it possible to produce color images on a screen.

Figure 6A:
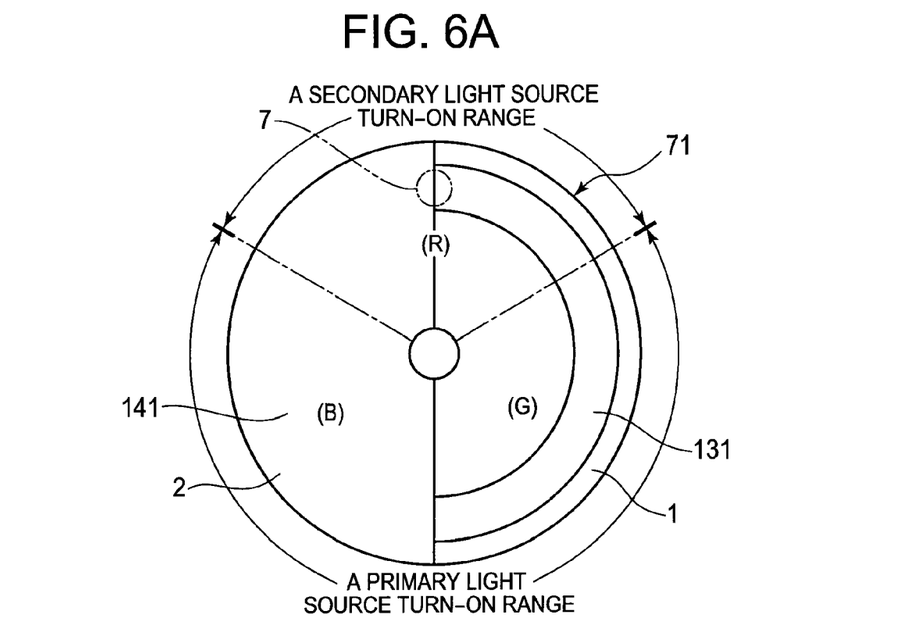
FIG. 6 shows exemplary front views of the luminous wheel which show turn-on ranges of a primary light source and a secondary light source according to the embodiment of the invention.

In addition, turning on and off the primary light sources 72 and the secondary light source 82 is controlled in a time sharing fashion by the light source control means. This control method can adopt various forms. However, for example, the light source control circuit 41, which is the light source control means, is set so that a fan-shaped area in which one of boundaries between the primary area 1 and the secondary area 2 constitutes a center thereof and its center angle is 120 degrees is referred to as a secondary light source turn-on range and the remaining area is referred to as a primary light source turn-on range, as is shown in FIG. 6A. By setting the light source control circuit 41 in that way, when the center of illumination areas 7 of the primary light sources 72 which are fixedly disposed is positioned on the secondary light source turn-on range, the light source control means controls so that the primary light sources 72 are turned off and the secondary light source 82 is turned on, whereas when the center of the illumination areas 7 of the primary light sources 72 is position on the primary light source turn-on range, the light source control means controls so that the secondary light source 82 is turned off and the primary light sources 72 are turned on.

By controlling the turning-on operation of the primary light sources 72 and the secondary light source 82 by the light source control means in the way described above, when the center of the illumination areas 7 is positioned on the secondary light source turn-on range, only red light (R) emitted from the secondary light source 82 is emitted from the light source unit 63 via the collective optical system and is then allowed to enter the light guiding unit 75.

Then, when the center of the illumination areas 7 is positioned on the primary area 1 in the primary light source turn-on range, blue light emitted from the primary light sources 72 is shone on to the luminescent material layer 131, and green luminescent light is then emitted from the luminescent material which receives the excitation light. Because of this, only the green light (G) is emitted from the light source unit 63 via the collective optical system and is then allowed to enter the light guiding unit 75. Note that as has been described above, a slight amount of blue light component which is reflected towards the primary light sources' 72 side is separated from the green light by the primary optical axis changing mirror 151a.

In addition, when the center of the illumination areas 7 is positioned on the secondary area 2 in the primary light source turn-on range, blue light emitted from the primary light sources 72 is shone on to the diffuse layer 141, and only blue light (B) which has passed through the diffuse layer 141 while being diffused is emitted from the light source unit 63 via the collective optical system and is then allowed to enter the light guiding unit 75.

Namely, by controlling times during which the primary light sources 72 and the secondary light source 82 are turned on by the light source control means, red light (R), green light (G) and blue light (B) are sequentially emitted from the light source unit 63. Because of this, the display device 51 displays the light of the respective colors which are entered in accordance with data in a time sharing fashion, whereby the projector 10 can produce color images on the screen.

Note that while the illustrated secondary light source turn-on range is configured so that the primary light sources 72 are turned off and the secondary light source 82 is turned on at the one of the boundaries of the two segment areas, the invention is not limited thereto. For example, a configuration may be adopted in which the primary light sources 72 are turned off and the secondary light source 82 is turned on at both the boundaries between the two segment areas so that different types of light of predetermined wavelength bands are emitted sequentially from the light source unit 63 in the order of red, green, red and blue.

In addition, the light source control means controls timings at which the primary light sources 72 and the secondary light source 82 are turned on and turned off so that just before either of the primary light sources 72 and the secondary light source 82 is turned off, the other light sources or light source is turned on due to a reduction in luminance being prevented that would otherwise be caused as a result of neither of the primary light sources 72 and the secondary light source 82 being turned on.

Additionally, the secondary light source 82 which emits red light is installed as the single-color light source and the primary light sources 72 and the secondary light source 82 can be controlled individually and separately by the light source control means. Because of this, the times during which the primary light sources 72 and the secondary light source 82 are turned on can freely be changed, whereby the light source unit 63 can be provided as a light source unit having a wide brightness mode.

The light source control means can adjust the luminance freely by controlling the times during which the primary light sources 72 and the secondary light source 82 are turned on so that a time during which light of each color is emitted becomes short. In addition, a configuration may also be adopted in which the light source control means controls the primary light sources 72 or the secondary light source 82 so that the output of the light source is suppressed only when light of a predetermined wavelength band is emitted for adjustment of tone.

Figure 6B:
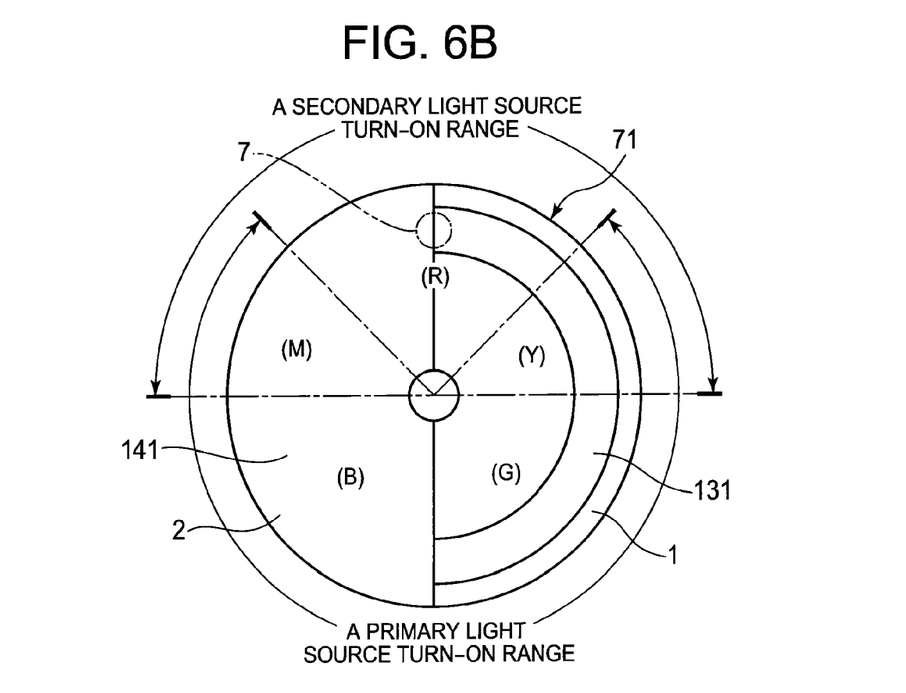

In addition, light of a wavelength band of magenta (M) or yellow (Y) which is a complementary color can be emitted from the light source unit 63 by turning on the primary light sources 72 and the secondary light source 82 simultaneously by a predetermined period of time. To be specific, as is shown in FIG. 6B, when the primary light sources 72 are turned on to shine blue light-source light on to the primary area 1, green light (G) is emitted, and when the luminous wheel 71 is turned to shine the light-source light on to the secondary area 2, blue light (B) is emitted. In the event that the secondary light source 82 is turned on after blue light is emitted for a predetermined period of time, blue light that has passed through the luminous wheel 71 is combined with red light that is emitted from the secondary light source 82, whereby light of the wavelength band of magenta (M) can be emitted stably from the light source unit 63 so as to be allowed to enter the light guiding unit 75.

Then, in the event that only the primary light sources 72 are turned off after the magenta light (M) has been emitted for a predetermined period of time, red light (R) from the secondary light source 82 is emitted from the light source unit 63. Further, in the event that the primary light sources 72 are turned on without turning off the secondary light source 82 after the red light (R) has been emitted for the predetermined period of time, the red light from the secondary light source 82 is combined with green light emitted from the luminous wheel 71, whereby light of the wavelength band of yellow (Y) can be emitted stably from the light source unit 63 so as to be allowed to enter the light guiding unit 75.

In this way, the light source control means controls the primary light sources 72 and the secondary light source 82 individually to turn on and also controls the primary light sources 72 and the secondary light source 82 to turn on simultaneously only for the predetermined period of time at the predetermined timing so that light emitted from the luminous wheel 71 when the luminous wheel 71 receives light from the primary light sources 72 is combined with light emitted from the secondary light source 82 only for the predetermined period of time, whereby not only light of the wavelength bands of the primary colors but also light of the wavelength bands of the complementary colors can be emitted from the light source unit 63, thereby making it possible to realize an increase in color reproduction capability by increasing the luminance of the light source unit 63.

Figure 7:
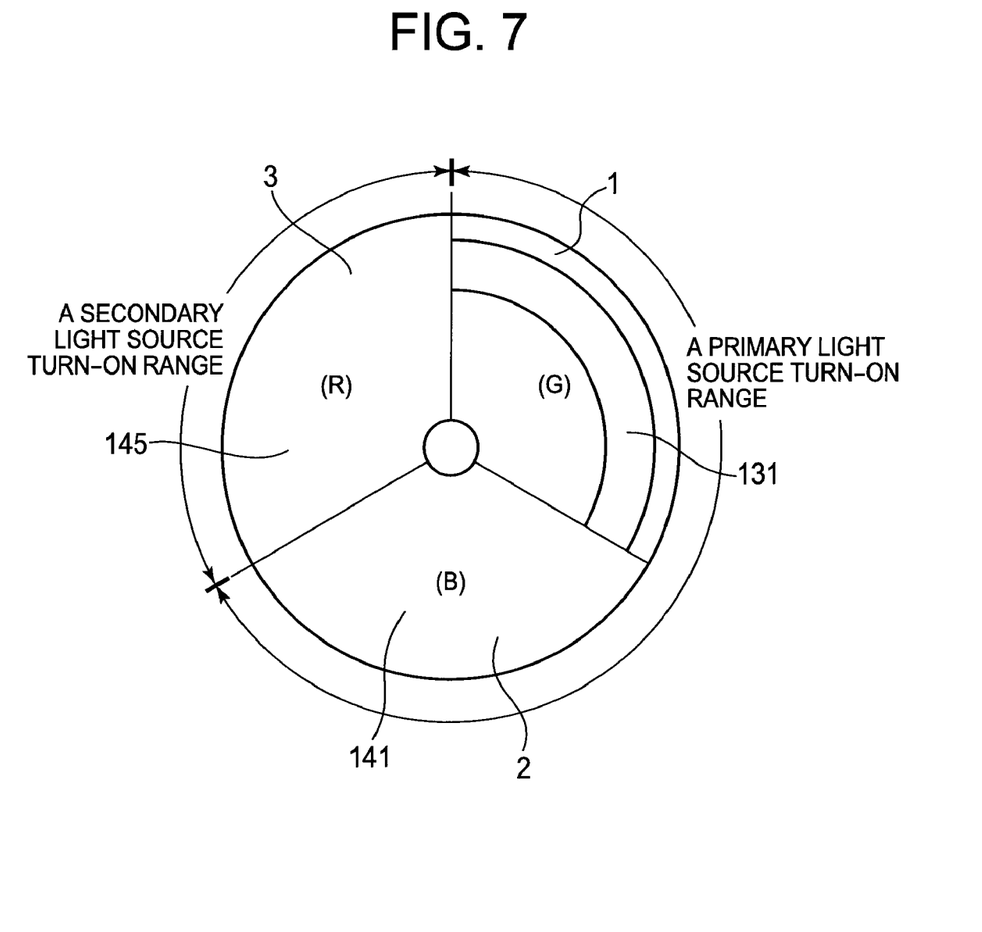
FIG. 7 is an exemplary front view of a luminous wheel of another form in the light source unit according to the embodiment of the invention.

In addition, the configuration of the luminous wheel 71 is not limited to the configuration shown in FIGS. 4 and 6 in which the luminous wheel 71 has the two segment areas, and hence, various configurations can be adopted. For example, as is shown in FIG. 7, three segment areas are formed on the luminous wheel 71. A primary area 1 is made into a reflecting portion, where a luminescent material layer 131 is formed which has a green luminescent material which emits green light. A secondary area 2 is made into a transmission portion having a diffuse layer 141 which allows blue light to pass therethrough. A non-transmission portion is formed on a tertiary area 3 which prevents the passage of light-source light from the primary light sources 72 by providing a mask on the tertiary area so as to cover the same area.

In this way, the non-transmission portion which prevents the passage of light from the primary light sources 72 is formed at the predetermined segment area and the secondary area 82 is shone only when light from the primary light sources 72 is cut out by the non-transmission portion, whereby red light (R) of the secondary light source 82 can be emitted from the light source unit 63 with the primary light sources 72 kept turned on.

In addition, the luminescent material layer 131 that is to be formed on the luminous wheel 71 is not limited to the luminescent material layer 131 which emits luminescent light of the green wavelength band. Therefore, luminescent material layers 131 may be provided which can emit light of various wavelength bands.

Additionally, the types of the light sources are not limited to the aforesaid embodiment. For example, blue light emitting diodes may be used for the primary light sources 72, and a laser emitter which emits laser light of the red wavelength band may be adopted for the secondary light source 82. By adopting the blue laser emitters for the primary light sources 72, excitation light with high output is emitted so as to excite the luminescent material with good efficiency, and the red light emitting diode is adopted for the secondary light source 82 to thereby suppress the production costs.

In the event that the primary light sources 72 and the secondary light source 82 are made up of laser emitters, a configuration may be adopted in which the diffuse layer 141 is not provided on the transmission portion of the luminous wheel 71 and the transmission portion is formed of a normal glass plate or a space as a through hole with a frame formed on the perimeter thereof and an optical part which imparts a diffuse effect is fixedly disposed on the optical path of laser light in a position lying directly close to the luminous wheel 71 on the primary light sources' 72 side, on the exit side of the luminous wheel 71 or in proximity to an exit side of the secondary light source 82. In addition, in the event that both the primary light sources 72 and the secondary light source 82 are made up of light emitting diodes, the light source unit 63 may adopt a configuration in which the diffuse layer 141 is not provided at the transmission portion or along the length of the optical path.

In this way, according to the invention, by providing the primary light sources 72 which excite the luminescent material, the luminous wheel 71 which includes the luminescent material of a type having a high luminous efficiency, and the secondary light source 82 which is the single-color light source for emitting light of the red wavelength band corresponding to a type of luminescent material with a relatively low luminous efficiency without forming the luminescent material with the low luminous efficiency such as a red luminescent material on the luminous wheel 71, there can be provided the light source unit 63 which can increase the luminance of the screen and the projector 10 including this light source unit 63.

In addition, since the light-source light is configured as being shone on to the luminous wheel 71 at the predetermined timing, compared with the configuration in which light is kept shone on to the luminous wheel 71 at all times, the time during which light is shone on to the luminous wheel 71 is reduced, thereby making it possible to suppress an increase in temperature. Consequently, a reduction in luminous efficiency attributed to an increase in temperature of the luminescent material can be suppressed, thereby making it possible to increase the luminous efficiency of the luminescent material.

Then, by adopting laser emitters emitting light of the blue wavelength band for the primary light sources 72, the luminescent material can be excited to emit light with good efficiency. In addition, by forming at least the luminescent material layer 131 having the luminescent material which emits light of the green wavelength band on the luminous wheel 71, light of the wavelength band of green, which is one of the primary colors, can be produced. Further, by providing the diffuse layer 141 on the transmission portion, laser light having directivity is allowed to pass therethrough while being diffused, light of the wavelength band of blue, which is another of the three primary colors, is allowed to enter the light guiding unit 75 as diffuse light similar to the luminescent light.

Further, the collective optical system is not limited to the configuration shown in FIG. 5, and hence, various optical layouts can be adopted. Consequently, the light source unit 63 can adopt various optical layouts by altering the types and disposition of the primary light sources 72, the secondary light source 82, the mirrors and the lenses. Because of this, not only can the luminance of the screen be increased as is discussed above, but also the degree of freedom can be increased in disposing equipment such as the projector 10 which installs therein the light source unit 63 configured as has been described.

In addition, the invention is not limited to the embodiment that has been described heretofore, and hence, the invention can be modified or improved without departing from the spirit and scope of the invention. For example, the light source control means may be provided separately in the light source unit 63 in place of being provided in the projector 10.

Further, the invention is not limited to the configuration in which the segment areas that are to be formed on the base material are divided equally. There may also be a situation in which four or more unequal segment areas are formed.

In addition, in the embodiment, while the laser emitters emitting laser light of the blue wavelength band are described as being used for the primary light sources 72, the invention is not limited thereto, and hence, for example, laser emitters emitting laser light of an ultraviolet wavelength band may be used for the primary light sources 72. As this occurs, a luminescent material layer 131 is desirably disposed on the transmission portion of the luminous wheel 71 which emits light of a different wavelength band from the light of the wavelength band which is emitted from the luminescent material layer 131 that is formed on the reflecting portion.

In addition, in the embodiment described above, while the dichroic mirrors are described as being used to change the optical direction or to selectively transmit or reflect light on the basis of wavelength, the invention is not limited thereto. For example, the dichroic mirrors may be replaced by other alternative means including dichroic prisms.

Additionally, the invention is not limited to the configuration in which the secondary light source 82 functions as the light source which emits light of the red wavelength band. Therefore, a light source may be used for the secondary light source 82 which emits light of a wavelength band other than the red wavelength band which is different from those of the luminescent light emitted from the luminescent material layer 131 and the excitation light emitted from the primary light sources 72.

According to the invention, by providing the light sources for exciting the luminescent material, the luminous wheel having the type of luminescent material having the good luminous efficiency, and the single-color light source for emitting light of the wavelength band corresponding to a type of luminescent material with a relatively low luminous efficiency without forming the luminescent material with the low luminous efficiency on the luminous wheel, there can be provided the light source unit which can increase the luminance of the screen and the projector including the light source unit so configured.

Additionally, the invention is not limited to the embodiment that has been described above, and hence, the invention can be modified variously without departing from the spirit and scope thereof when the invention is actually carried out. In addition, the invention may be carried out by appropriately combining as many functions executed in the embodiment described above as possible. The embodiment described above includes various steps and various inventions can be extracted by an appropriate combination of a plurality of constituent features disclosed. For example, as long as the advantage can be obtained even though some constituent features are deleted from the whole of the constituent features, the resultant configuration in which those constituent features are deleted can be extracted as an invention.

21 Input/Output Connector Part
22 Input/Output Interface
23 Image Transform Part
24 Display Encoder
25 Video RAM
26 Display Drive part
31 Image Compression/Expansion Part
32 Memory Card
35 Ir Reception Part
36 IR Processing Part
37 Keys/Indicators Part
38 Control Unit
41 Light Source Control Circuit
43 Cooling Fan Drive Control Circuit
47 Audio Processing Part

What is claimed is:

1. A light source unit comprising:

a light emitting plate which has a plurality of segment areas on a base material, wherein at least one of the plurality of segment areas comprises a reflecting portion, a luminescent material layer is formed on the reflecting portion and emits light of a predetermined wavelength band by receiving excitation light, and at least one of the plurality of segment areas comprises a transmission portion which transmits light;

a primary light source which shines the excitation light onto the luminescent material layer and the transmission portion;

a secondary light source which emits light of a wavelength band which is different from a wavelength band of the luminescent light emitted from the luminescent material layer and a wavelength band of the excitation light emitted from the primary light source;

a collective optical system which collects the luminescent light emitted from the luminescent material layer and light that passes through the transmission portion, which are emitted from the light emitting plate, and light emitted from the secondary light source so as to cause the collected light to converge to a same optical path; and light source control means which controls the emission of light from the primary light source and the secondary light source;

wherein the collective optical system includes:

a dichroic mirror which is disposed between the primary light source and the light emitting plate to allow passage of the excitation light and to reflect the luminescent light emitted from the luminescent material; and pluralities of reflecting mirrors and dichroic mirrors which collect the excitation light that passes through the transmission portion of the light emitting plate, the luminescent light reflected on the dichroic mirror, and the light emitted from the secondary light source so as to cause the collected light to converge to the same optical path to be emitted towards a same direction.

2. A light source unit as set forth in claim 1, wherein the primary light source is a laser emitter that emits light of a blue wavelength band.

3. A light source unit as set forth in claim 2, wherein the luminescent material is a luminescent material which emits light of a green wavelength band by receiving at least the excitation light.

4. A light source unit as set forth in claim 2, wherein a diffuse layer which diffuses the light from the primary light source is formed on the transmission portion of the light emitting plate.

5. A light source unit as set forth in claim 1, wherein the secondary light source is a light emitting diode that emits light of a red wavelength band.

6. A light source unit as set forth in claim 1, wherein the light emitting plate has a circular disc shape, and a driving unit is provided for rotating the light emitting plate in a circumferential direction.

7. A projector comprising:

the light source unit set forth in claim 1;

a display device;

a light source side optical system for guiding light from the light source unit to the display device;

a projection side optical system for projecting an image emitted from the display device on to a screen; and a projector control means for controlling the light source unit and the display device.

* * * * *